FIG. 1

INVENTOR
PHILIP M. HULME

Oct. 19, 1954    P. M. HULME    2,692,196
METHOD AND APPARATUS FOR TREATING MOLTEN METAL
Filed Dec. 7, 1951    8 Sheets-Sheet 3

FIG. 3

INVENTOR
PHILIP M. HULME
BY
H. Hume Mathews
ATTORNEY

Oct. 19, 1954 P. M. HULME 2,692,196
METHOD AND APPARATUS FOR TREATING MOLTEN METAL
Filed Dec. 7, 1951 8 Sheets-Sheet 4

INVENTOR
PHILIP M. HULME
BY
ATTORNEY

Oct. 19, 1954     P. M. HULME     2,692,196
METHOD AND APPARATUS FOR TREATING MOLTEN METAL
Filed Dec. 7, 1951     8 Sheets-Sheet 5

INVENTOR
PHILIP M. HULME
BY
H. Hume Mathews
ATTORNEY

Oct. 19, 1954     P. M. HULME     2,692,196
METHOD AND APPARATUS FOR TREATING MOLTEN METAL
Filed Dec. 7, 1951     8 Sheets-Sheet 6

INVENTOR
PHILIP M. HULME
BY
*H. Hume Mathews*
ATTORNEY

Oct. 19, 1954  P. M. HULME  2,692,196
METHOD AND APPARATUS FOR TREATING MOLTEN METAL
Filed Dec. 7, 1951  8 Sheets-Sheet 7

INVENTOR
PHILIP M. HULME
BY
ATTORNEY

Patented Oct. 19, 1954

2,692,196

UNITED STATES PATENT OFFICE 2,692,196

METHOD AND APPARATUS FOR TREATING MOLTEN METAL

Philip M. Hulme, Stamford, Conn., assignor to Air Reduction Company, Incorporated, New York, N. Y., a corporation of New York Application December 7, 1951, Serial No. 260,497

The portion of the term of the patent subsequent to December 11, 1968, has been disclaimed 4 Claims. (Cl. 75—51)

1

This invention relates to improvements in the refining of molten metal, and more especially to a novel method and apparatus for treating molten ferrous metal with calcium carbide to reduce the sulphur content thereof and to raise the quality of the resulting cast iron or steel products.

The present application is a continuation-in-part of my copending application Serial No. 125,607, filed November 4, 1949, now Patent No. 2,577,764, and assigned to the assignee of this application.

Sulphur is an undesirable element which is always present in ferrous metals. The sulphur is derived from the ore, the scrap or the fluxes making up the charge and from the fuel used, and it may also enter the metal from other sources. In recent years, the demand for iron and steel of relatively low sulphur content has increased markedly. At the same time, due to exhaustion of better materials, the available ore, scrap, fluxes and fuels have been of such quality that molten iron and steel produced from them have tended to be considerably higher in sulphur content than formerly. Thus, the necessity for a practical and economical method of and apparatus for reducing the sulphur content of the metal is presented.

It has been known for many years that calcium carbide is an excellent desulphurizing agent for iron and steel, since it combines readily with the sulphur present therein. Nevertheless, it has not been utilized because of the difficulty arising from the fact that calcium carbide does not melt at the temperatures of molten iron and steel. The reaction must be effected between a solid reagent and the liquid molten metal. It depends, therefore, upon surface contact between the solid calcium carbide and the molten metal. The problem of securing sufficient contact to effect the desired reaction rapidly and economically has been heretofore insurmountable.

It has been proposed to blow the calcium carbide, in a finely divided condition and suspended in a stream of gas, into the molten metal. Such a suspension requires the use of a large amount of gas in proportion to the carbide supplied. The suspended carbide is principally carried in the bubbles of gas which rise through the molten metal and never comes into contact therewith. Most of the carbide used is thus ineffective, and the low efficiency of the procedure makes it impractical. Other previous proposals for introducing carbide to molten metal are equally ineffective or impractical because they fail to

2 assure the maximum surface contact between the reagent and the metal or for other reasons.

Thus, it has been realized that calcium carbide is a good desulphurizer, but it has not been possible to develop a suitable method permitting the carbide particles to come into intimate contact with the molten metal. On page 317 of the 1946 Handbook of Cupola Operation (American Foundrymen's Association) the following statement appears:

"Calcium carbide ($CaC_2$) is an active desulphurizing agent, although its use in foundries is only of academic interest. To ensure uniformly efficient results, the reagent must be introduced below the surface of the bath or thoroughly stirred into the iron by mechanical means, both of which are impractical in large scale commercial operations."

The present application includes an efficient and practical method and apparatus for injecting calcium carbide in a metal bath as disclosed in my copending application S. N. 125,607 together with certain hereinafter disclosed improvements and modifications, to provide a method and apparatus for producing a highly efficient reaction between calcium carbide and a molten ferrous bath over long periods of time under the adverse high temperature conditions normally encountered in iron and steel manufacturing practice.

An object of the present invention is to provide an improved method and apparatus, adapted for large scale commercial use, for treating molten ferrous metal with calcium carbide so that substantially all the carbide reacts with impurities in the molten metal and so that substantially complete sulphur removal from the molten metal can be effected.

Another object is to provide an effective, economical method and apparatus for treating molten metal with a treating agent, such as calcium carbide, continuously for long periods of time and with high reaction efficiencies.

Other objects and advantages of the invention will be apparent as it is better understood by reference to the following specification and the accompanying drawing, in which:

Actual experiments have revealed the fact that the proportional amount of gas used heretofore in the effort to introduce calcium carbide to molten metal is such that the gas in which the carbide is suspended merely serves to carry most of the carbide through and out of the molten metal before it can accomplish its purpose. The major part of the carbide never becomes sufficiently wetted by the molten metal to effect the intimate contact necessary for its reaction with the sulphur. With the present invention, while a gas is employed, it is not used as a carrier for the carbide. Its purpose is merely to prevent the molten metal from rising in the submerged passage through which the carbide is delivered beneath the surface of the molten metal. The carbide is fed regularly and in predetermined amounts and at predetermined rates and falls by gravity through the passage and is thus disseminated through the molten metal as it rises therethrough. While the gas will escape and rise as bubbles through the molten metal, the gas does not carry any substantial portion of the carbide in suspension because of the relatively low ratio of gas to solid and thus does not remove it from effective contact with the metal before the reaction can be accomplished.

The experiments have shown that the use of not more than one-quarter to two cubic feet of gas per pound of calcium carbide is ample for the purpose, provided the gas is maintained at a pressure sufficient to overcome the static head of the molten metal and thus prevent entrance thereof into the passage through which the calcium carbide descends by gravity. It has been found that when the calcium carbide and the gas are employed in the proportions indicated, it is possible to effect a better than 90% extraction of the sulphur from the molten metal with 35% efficiency of the carbide reaction. This is in marked contrast with the procedure as heretofore employed, which utilizes approximately 100 cubic feet of the gaseous carrier per pound of calcium carbide, with approximately 10% extraction of the sulphur and an efficiency of 1% in the carbide reaction. By minimizing the amount of gas employed, most of the calcium carbide supplied comes into intimate contact with the molten metal and thus has an opportunity to react and remove the sulphur from the metal. It is obvious that the use of two cubic feet of gas per pound of carbide greatly reduces the chilling effect in comparison with the conventional method, which requires approximately 100 cubic feet of gas per pound of carbide.

Another limiting condition required to effect the desired result is that the apparent linear velocities of the gas passing through the conduit shall not exceed 25 linear feet per second. If it exceeds that limit, an excessive amount of the solid material is carried rapidly to the surface and consequently it does not have an opportunity to be wetted by the molten metal and to react therewith. The apparent linear velocity is the cubic feet of gas passing through a conduit per second divided by the cross-section of the conduit, regardless of temperature, pressure and compressibility factors of the gas involved and irrespective of the quantities of solids passing through the same conduit.

Figure 1:
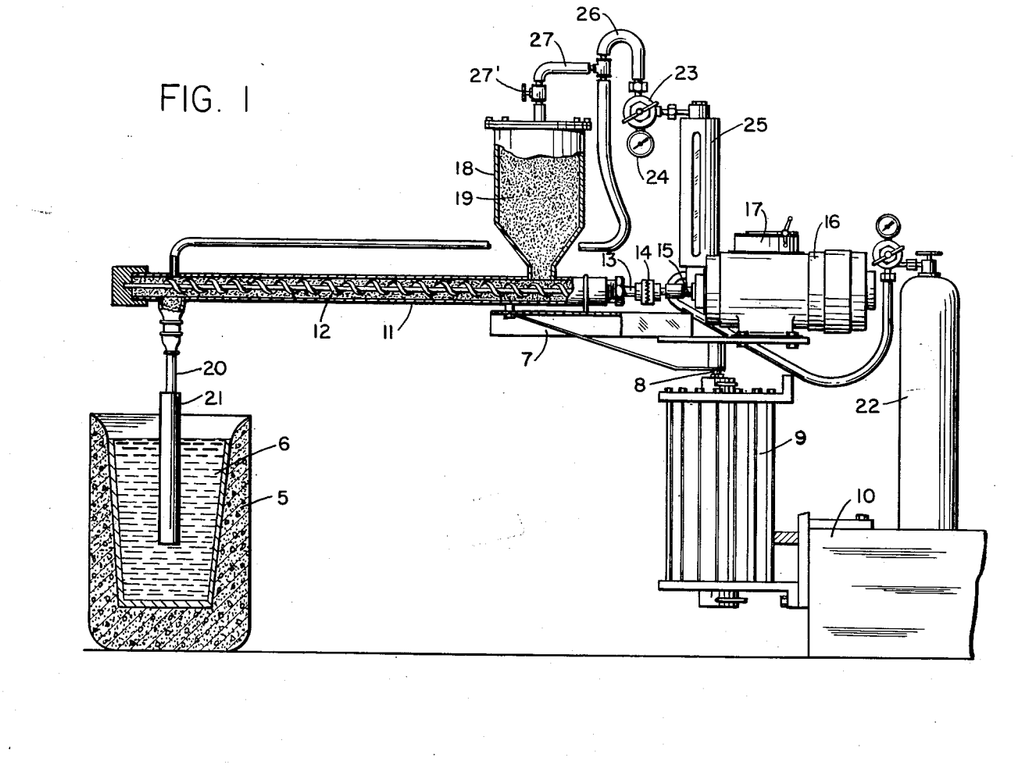
Fig. 1 is an elevation partially in section showing an apparatus suitable for the practice of the present invention in a batch operation.

The operation can be carried out readily in any suitable receptacle. This is illustrated in Fig. 1, in which a receptacle 5 carries a charge 6 of molten metal for treatment in a batch operation. To facilitate the treatment, a frame 7 is mounted on the plunger 8 of a hydraulic cylinder 9 which is suitably supported on a base 10. The frame 7 carries a tube 11 in which a worm 12 is adapted to be driven by a shaft 13 connected by a coupling 14 to the shaft 15 of a motor 16, the shaft 15 being driven through a suitable variable speed mechanism 17.

A hopper 18 is adapted to contain a charge of carbide 19 in suitable finely divided form. The carbide descends from the hopper into the tube 11 and is advanced by the worm 12 to the end of the tube 11, where it falls by gravity into a tube 20 which extends into a heat-insulated and refractory member 21. The latter, when the apparatus is lowered to the position indicated in Fig. 1, extends well into the molten metal and the carbide is disseminated therethrough.

In order to prevent the molten metal from rising in the member 21, a suitable gas is provided in a container such as a cylinder 22 which is connected through a flowmeter 25 to a pressure-reducing valve 23 having a gauge 24 which indicates the pressure. The gas is delivered as required through a pipe 26 which extends to a point adjacent the end of the worm 12. Thus, gas is supplied at the proper pressure to the tube 20 and the member 21 through which the carbide is fed to the molten metal. A by-pass pipe 27 with a valve 27' connects the pipe 26 to the closed cover 28 of the hopper 18 so that the gas pressure is equalized in the chamber above the carbide 19.

As hereinbefore indicated, the pressure of the gas supplied is maintained at a point which will overcome the static head of the molten metal in the member 21, thus preventing the molten metal from rising in the passage through the member 21, leaving the carbide free to fall by gravity to the lower end of the member 21. The volume of gas supplied is restricted so as to maintain the desired pressure and the proper ratio of gas to the amount of carbide fed. Thus, the carbide enters the molten metal and, because it is lighter, tends to rise therethrough, but no substantial proportion is carried away in the gas bubbles as in the procedure heretofore suggested and employed. Consequently the sulphur has ample opportunity to react with the carbide in the molten metal and the desulphurization is effected rapidly.

Figure 2:
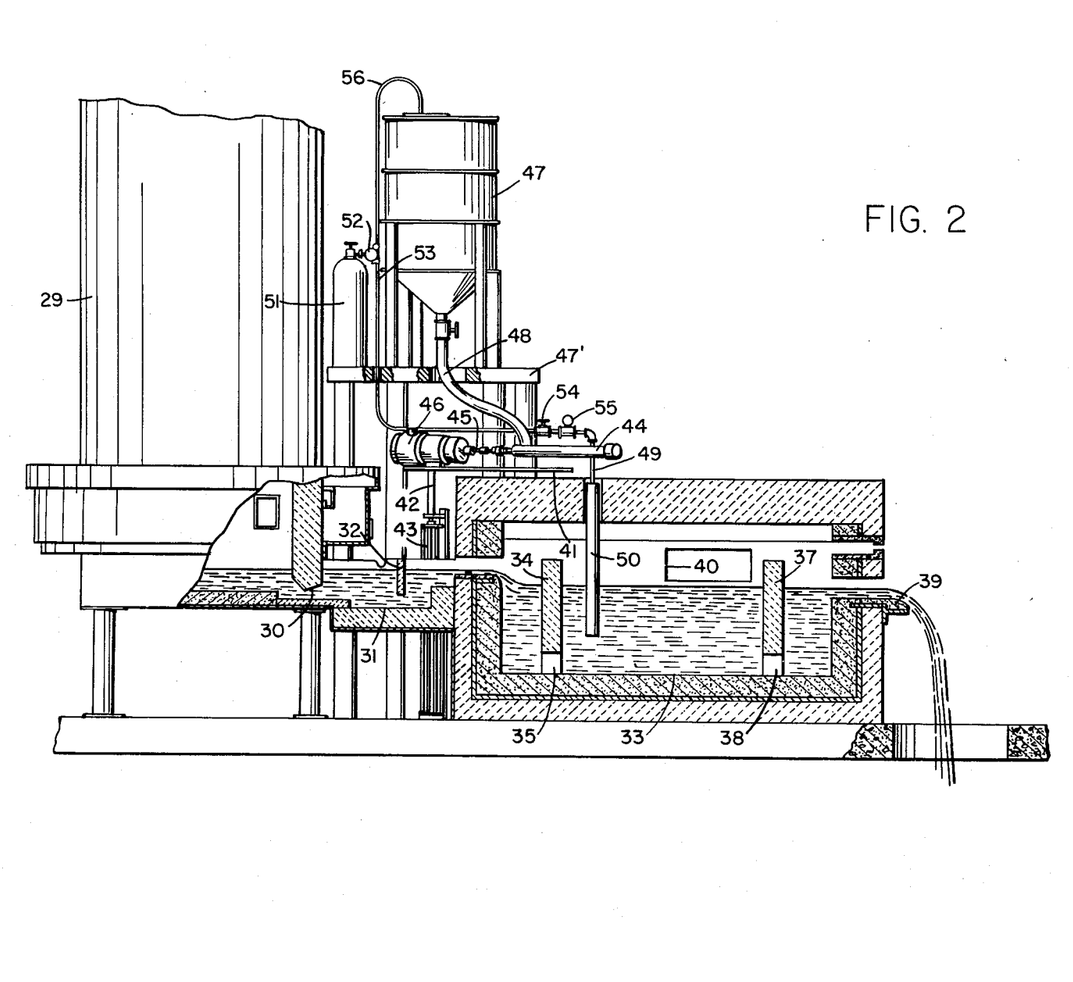
Fig. 2 is a similar view illustrating a continuous operation involving the use of a melting furnace or cupola and a forehearth where the desulphurization of the molten metal is effected.

Referring to Fig. 2, an apparatus is shown for the continuous desulphurization of molten ferrous metal which is supplied from a melting furnace or cupola 29 which is adapted to deliver the metal continuously at a predetermined rate through the opening 30 provided for that purpose. The details of the furnace form no part of the present invention and are well understood in the art.

The molten metal is delivered into a slag skimmer 31, having a baffle 32 to eliminate the slag, and thence into the forehearth 33 having a baffle 34 with an opening 35 at the bottom thereof and a baffle 37, the latter having an opening 38 at the bottom thereof. The baffle 37 prevents the slag and the reaction product of the carbide from passing to the outlet spout 39 of the forehearth. The slag may be withdrawn as required through an opening 40 in the wall of the forehearth.

A frame 41 is supported on the plunger 42 of a hydraulic cylinder 43 as in Fig. 1. The frame 41 supports a tube 44 enclosing a worm (as in Fig. 1) which is driven by a shaft 45 connected to a variable speed motor 46. Calcium carbide is maintained in a hopper 47 mounted on the support 47', and the carbide is delivered through a flexible tube 48 to the tube 44. It is delivered by the worm to a pipe 49 which is connected to the heat-insulated and refractory member 50 which extends through the roof of the forehearth 33 and may be lowered so that its lower end is submerged in the molten metal.

A cylinder 51 affording a supply of gas is connected through a pressure-reducing valve 52 to a pipe 53 which extends through a control valve 54 and pressure indicator 55 to the tube 44, thus supplying gas at suitable pressure to prevent the molten metal from rising in the member 50. A by-pass pipe 56 delivers gas to the hopper 47 to maintain a balanced pressure on the carbide in the hopper 47.

The carbide is delivered at a regulated rate to the member 50, and gas is supplied at a pressure sufficient to overcome the static head of the molten metal in the member 50 and in relatively small volume required by the hereinbefore specified ratio, so that the gas does not act as a carrier for the carbide but merely prevents the molten metal from rising in the passage through which the carbide descends into the molten metal.

Since the sulphur reaction with carbide in the molten metal is essentially a solid to liquid reaction, the particle size of the carbide is important. The smaller the particle size, the greater the surface area is in proportion to the weight of the carbide. This fact, plus the feature of having the particles completely wetted by the molten metal, produces a high reaction efficiency. I have found that the particles must be finer than 10 mesh and that preferably at least 50% of the total carbide should be finer than 48 mesh. Actually, the only limitation on the extreme fineness of the carbide particles is their practicable flowability.

Since the particles of carbide are light compared to the liquid metal, they rise rapidly towards the surface. While the reaction rate between carbide and the sulphur is relatively rapid, it does require some time for the reacting substances to come in contact. Therefore, the longer the wetted carbide can be kept in direct contact with the metal, the higher the efficiency. In order to gain sufficient time of contact, the particles should travel a substantial distance through the metal. Hence the depth of immersion of the conduit has a definite and direct bearing on the efficiency of the reaction. For example, if the conduit through which the carbide passes is immersed only one inch below the surface, the reaction efficiency is in the order of 1 to 2%. When the conduit is immersed at least ten inches, the efficiency is increased to approximately 35%. In any event, the end of the conduit should extend at least six inches into the molten metal and preferably more than one half of the depth of the molten metal. Thus, in the operation, it is preferably to use a furnace, ladle or other equipment which is relatively deep. This facilitates longer contact time of the carbide with the metal.

The following data shows the results obtained:

| Test No. | Original Percent S | Final Percent S | Percent Extraction | Percent Efficiency | lb. of CaC₂ per lb. of S Removed |
|---|---|---|---|---|---|
| a | .154 | .007 | 95.5 | 23.4 | 12.2 |
| b | .136 | .006 | 95.5 | 21.5 | 13.3 |
| c | .152 | .008 | 93.5 | 26.5 | 10.8 |
| d | .176 | .009 | 95.5 | 24.8 | 11.5 |
| e | .176 | .010 | 94.3 | 29.2 | 9.8 |
| f | .184 | .014 | 92.5 | 40.3 | 7.1 |
| g | .277 | .060 | 78.4 | 47.6 | 6.0 |

With the proposed carbide practice, the total treatment time consists of approximately ten minutes, with actual injection time of one minute—the remaining time is necessary to permit the dispersed particles of reaction products to rise to the surface. The more finely divided the particles and the more thoroughly dispersed, the more time is necessary for them to separate from the molten metal. In the continuous operation as described in connection with Fig. 2, the rate of flow of the molten metal can be regulated readily to allow ample time for the reaction and separation. In using the forehearth, the size and shape of the vessel and the internal construction must be such that an efficient process is realized. Each amount of metal passed per minute must be retained in the forehearth sufficiently long to allow the reaction and separation to occur. Assuming that the total treatment time shall consist of ten minutes, and a 10-ton per hour operation is being conducted, the rate of flow per minute will be $$\frac{10 \times 2000}{60}$$

or 333 pounds per minute. Therefore the container in which desulphurization takes place should be capable of holding 3330 pounds of molten metal in order to allow for the inverse settling of the removed sulphur which comes to the surface of the metal in combination with the calcium carbide introduced.

Exceptionally low levels of sulphur content in molten ferrous metal may be attained with the apparatus illustrated in Figures 1 and 2 in a comparatively short time. The advantages are obvious in a great many cases. For instance, in open hearth operations, depending on cupola iron for hot metal, the cupola iron runs anywhere from .17 to .20 per cent sulphur, and when a final specification of .025 is required, at least two hours of extra refining is needed in the open hearth. Also, several times the normal lime and ferromanganese additions must be made to meet the specification. Now, if the cupola iron is originally reduced to less than .010 in sulphur, no time is required in the open hearth for desulphurizing, less lime and ferromanganese are required, and the total slag volume is one-third or one-half that in the former practice, and as a result, the metal loss is considerably lower because of the smaller quantity of iron oxide in the slag. Also, if the cupola iron has a low sulphur content of approximately .005 sulphur, the mere mixing of it with molten scrap of higher sulphur content results in a mixture well below specification.

Various gases may be used, provided the selected gas is dry and oxygen-free, such as a gas inert with respect to the molten metal or any non-oxidizing gas. The most readily available and cheapest gases are nitrogen, carbon dioxide, propane and natural gas. The precise composition of the gas is immaterial so long as it does not enter into any chemical or oxidizing reaction with the molten metal. Nitrogen, for example, could be employed, although the cheaper gases are just as efficient.

Referring to Figs. 3, 4, 7 and 8, the invention may be applied to the continuous treatment of molten ferrous metal which is supplied from a melting furnace or cupola 129 which is adapted to deliver the metal continuously at a predetermined rate through an opening or cupola tap hole provided for that purpose. The molten metal is delivered into a slag skimmer 131, having a baffle 132 to eliminate the slag through notch 134, and thence through passage 128 of the forehearth 133, having side wall 127 with an opening 137 at the bottom thereof. A slagging bay or opening 140 through the wall of the forehearth permits withdrawal of the slag and reaction products as required. Metal is tapped intermittently from the forehearth by removing a clay bot in tap hole 139, thus allowing the metal to flow through the tap hole 139 and a tapping spout.

The carbide feed mechanism is supported on a frame 141 carried by a column 142 resting on the floor. The frame 141 supports a tube 144 enclosing a worm which is driven by a shaft 145 connected to a variable speed motor 146. Calcium carbide is maintained in a hopper 147 mounted on the charging floor or support 147', and the carbide is delivered through a flexible tube 148 to the tube 144. It is delivered by the worm at a selected rate of feed to an injection pipe 149 surrounded by plastic refractory material, and the pipe extends through the side wall of the forehearth and terminates at least three (3) inches from the floor of the forehearth, and not less than six (6) inches below the minimum surface level of the metal. Construction of this pipe is described in greater detail hereinafter.

A number of cylinders (not shown) affording a supply of gas under pressure are connected through pressure-reducing valves 152 to a pipe 153 which extends through a flow meter 154 and needle valve 155 to the outer end of tube 144, thus supplying gas to the upper end of pipe 149 at a controlled rate of flow and at suitable pressure to prevent the molten metal from rising in pipe 149. A by-pass pipe 156 with a valve 158 delivers gas to the top of hopper 147 to maintain a balanced pressure on the carbide in the hopper. Other details of the screw feed and gas feed are more specifically shown and described in connection with Figs. 1 and 2.

Figure 3:
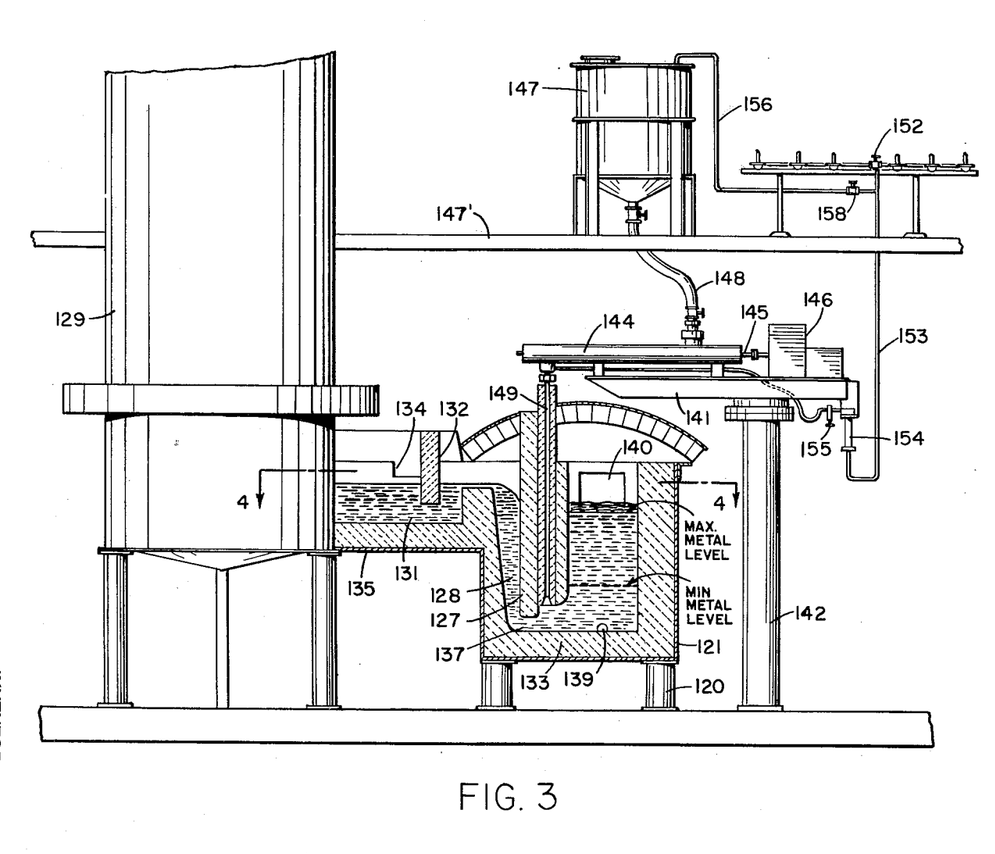
Fig. 3 is an elevation partly in section, and omitting certain structural details in order to simplify the drawing, illustrating another continuous operation involving the use of a cupola or melting furnace and a holding vessel where treatment of the molten metal is effected.
Figure 4:
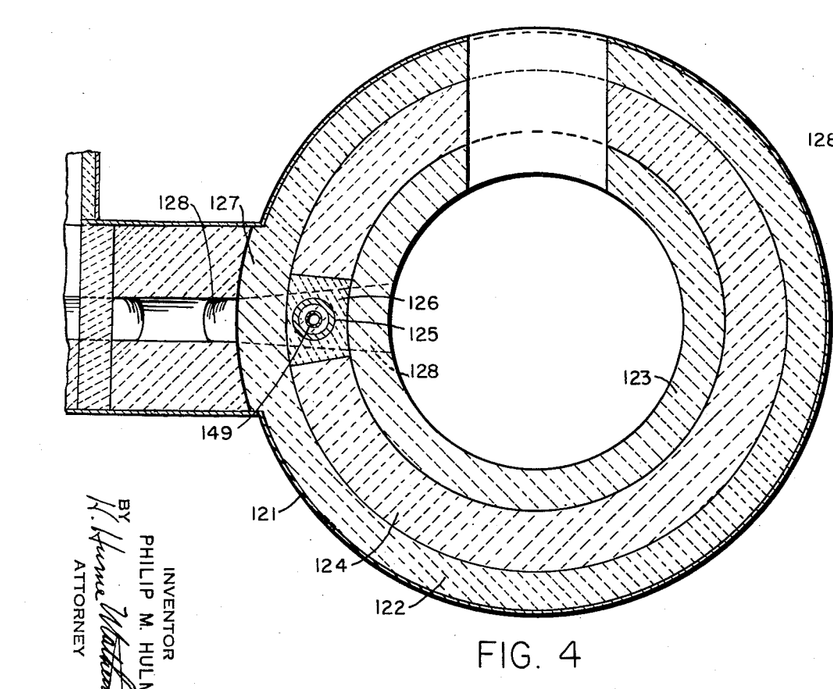
Fig. 4 is a detailed section on the line 4—4 of Fig. 3, indicating the modifications necessary on a standard forehearth structure to permit the improved treating procedure.

The carbide is delivered by the worm conveyor in tube 144 at a regulated rate to pipe 149, and gas is supplied at a pressure sufficient to overcome the static head of the molten metal in the pipe 149 and in a small volume relative to the rate of carbide flow so that the gas does not act to trap the carbide particles in bubbles which isolate the carbide from the metal but merely prevents the molten metal from rising in the pipe or passage through which the carbide descends, and enables the carbide to pass from the injection tube into the molten bath. Both the rate of carbide flow in pounds per minute and the rate of gas flow in cubic feet per minute are controlled, to maintain a predetermined range of gas to carbide ratios, the gas flow being maintained at less than about two cubic feet per pound of carbide injected and preferably within the range of from about one-quarter (¼) cubic foot to a maximum of about two (2) cubic feet of gas (STP) per pound of carbide injected. The carrier gas is preferably substantially inert with respect to the bath. It is the carbide that acts as a treating agent, and the carrier or transfer gas should be such as not to produce any appreciable or detrimental reaction with the molten metal or the carbide itself. For example, suitable gases are nitrogen, carbon dioxide, carbon monoxide, and mixtures of any two or all three of these gases.

Figure 8:
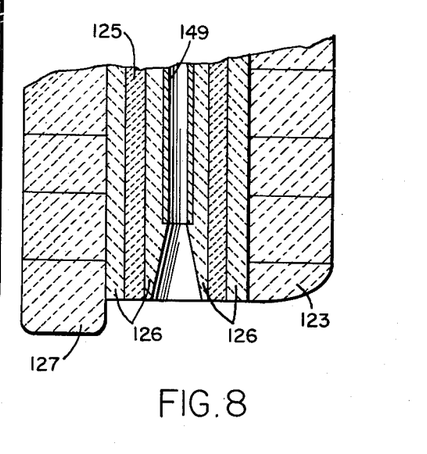
Fig. 8 is an enlarged view showing the construction details of the lower end of the injection tube of Figs. 3 and 4, and illustrating the position of the injection tube relative to the side wall of the forehearth, and like details.

The forehearth 133 is connected to the cupola 129 by a trough 135 and is supported by legs 120 resting on the foundry floor. The outer shell 121 of the forehearth is cylindrical and is constructed of steel plate. The outer lining 122 and center lining 124 consist of blocks or bricks made of fire clay with fairly high alumina-content. Inner lining 123 may be composed of acid or basic brick—fire clay brick having a fairly high alumina-content or basic brick such as magnesia, chrome or dolomite. At the intersection of the trough with the forehearth 133, the construction of the usual walls is revised to incorporate therein the injection pipe 149. As shown in Figs. 4 and 8, the bottom portion of such pipe is surrounded by a 4" cylindrical refractory clay tube 125; and the central section of the vertical wall is then rammed with plastic refractory lining 126. When the inner lining 123 is composed of acid brick, lining 126 is composed predominately of alumina and some silicon dioxide; when lining 123 is composed of basic brick, lining 126 is composed of a basic plastic refractory (such as KN, a trade name for a commercial plastic chrome ore). The plastic materails are highly refractory, have low permeability, high bond strength, and are easily rammed into place. At the intersection of the trough and forehearth, a 6-inch lining 127 of blocks or bricks made of fire clay forms the outer refractory wall of the forehearth.

Figure 5:
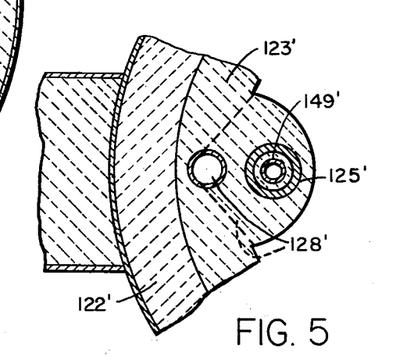
Fig. 5 is a modified form of a portion of the forehearth structure shown in Fig. 4.

In the forehearth construction shown in Fig. 5, the molten metal coming from the cupola 129 and through the skimmer 131 passes over the outer lining 122' of the forehearth and thence through an iron inlet duct 128' extending through the inner lining 123'. A built-up rib made of the same refractory material as lining 123' and extending therefrom is provided to accommodate the injection pipe 149' and tube 125'.

Figure 6:
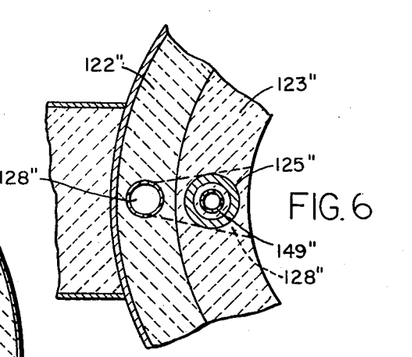
Fig. 6 illustrates another form of the forehearth structure.
Figure 7:
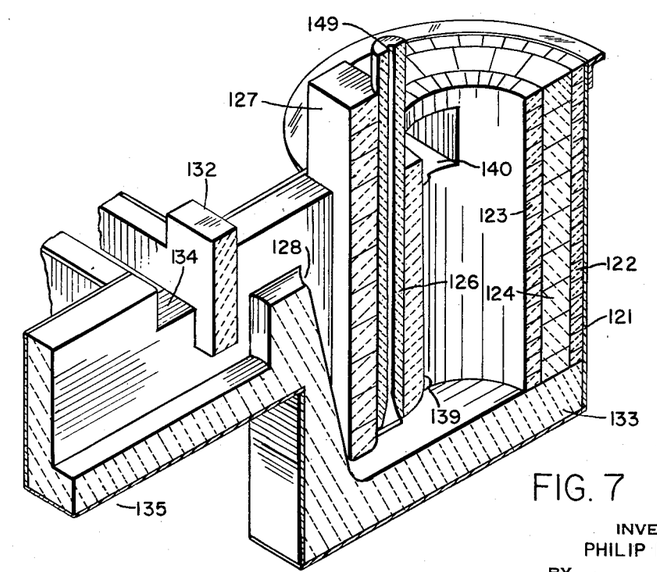
Fig. 7 is a sectional elevation in isometric of the apparatus illustrated in Figs. 3 and 4.

In the forehearth construction shown in Fig. 6, the molten metal from the cupola 129 descends into the forehearth 133 through an iron inlet duct 128" extending through the outer lining 122". Injection pipe 149" and tube 125" extend through the inner lining 123".

Referring to Fig. 8, injection pipe 149 is a standard 1″ steel pipe which terminates at a distance of eight (8) inches from the forehearth floor; and the refractory material 126 extending from such pipe to the molten metal may be flared or conical in section. Lining 127 extends two (2) inches beyond the bottom surface of tube 125 and terminates at a distance of about three (3) inches from the floor.

Figure 9:
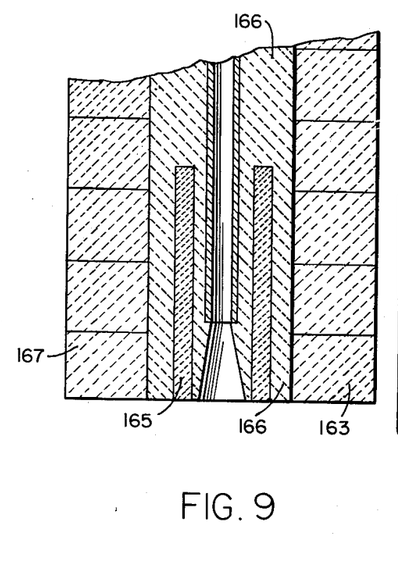
Figs. 9, 10, 11, 12, and 13 are modified forms of the apparatus shown in Fig. 8.

Fig. 9 is similar to Fig. 8 except that the ends of the tube 165 and linings 163, 166, and 167 are flush and thus all terminate the same distance from the forehearth floor.

Figure 10:
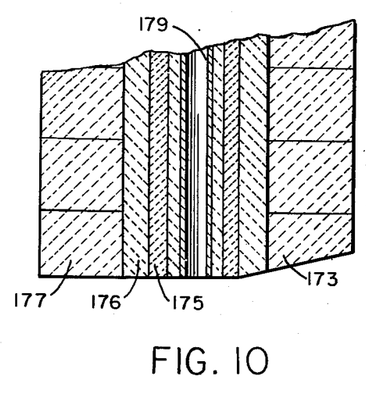

Fig. 10 is similar to Fig. 9 except that the bottom open end of injection pipe 179 is flush with the bottom exposed surfaces of linings 176 and 177 and tube 175; and the bottom surface of inner linging 173 is at an acute angle with respect to the floor, in the neighborhood of 3° to 10°, or the bottom surface is chamfered or rounded off, for example, like the lower right hand portion of lining 123 in Fig. 8.

Figure 11:
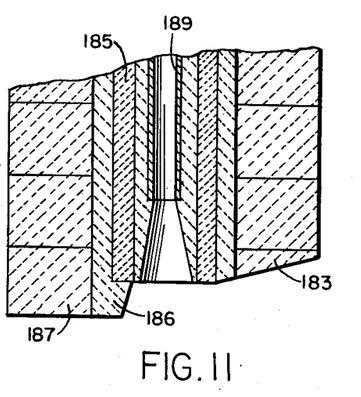

In Fig. 11, lining 187 and that portion of lining 186 between the injection pipe 189 and lining 187 extend a short distance (about 2″) past the bottom end of tube 185; and the bottom surface of lining 183 is at an acute angle with respect to the floor, or it is chamfered or rounded off as in Fig. 8.

Figure 12:
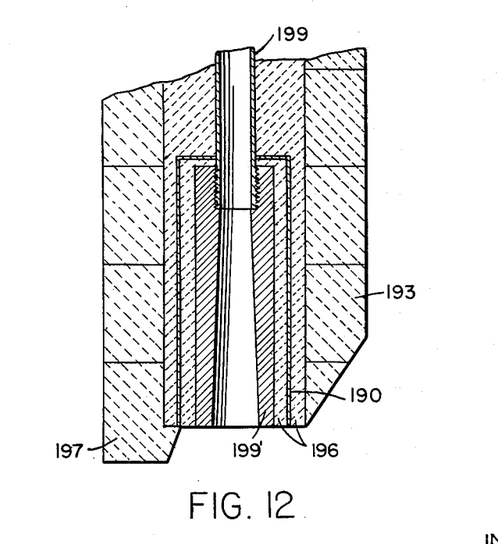

Fig. 12 shows another form of the pipe injection assembly. The bottom end of the one-inch steel injection pipe 199 terminates at a distance of about twenty-three (23) inches from the floor, and extends at least two inches into a steel shell 190 having an external diameter of six inches and terminating at a distance of about five inches from the forehearth floor. A graphite bore 199′ having an external diameter of approximately four inches and an internal diameter ranging from one to two inches is threaded onto the bottom end of the pipe 199 and also terminates at a distance of about five inches from the floor. Lining 197 extends a short distance (about 2″) past the end of bore 199′ and shell 190, and terminates at a distance of at least three (3) inches from the floor. The bottom surface of lining 193 forms an angle of not less than 45° with the floor. A plastic refractory material 196 is packed between the bore 199′ and the shell 190. Since both the bore 199′ and the shell 190 extend all the way to the fresh incoming metal from the cupola, there is no loss of gas pressure, so that the carbide is being fed regularly into the molten metal without any clogging of the injection tube 199 or of any extension thereof. Molten metal does not wet the bore 199′ nor accumulate thereon to cause clogging. The plastic refractory material 196 rammed between the bore and the shell holds the bore in place and prevents any molten metal from rising between it and the shell.

Figure 13:
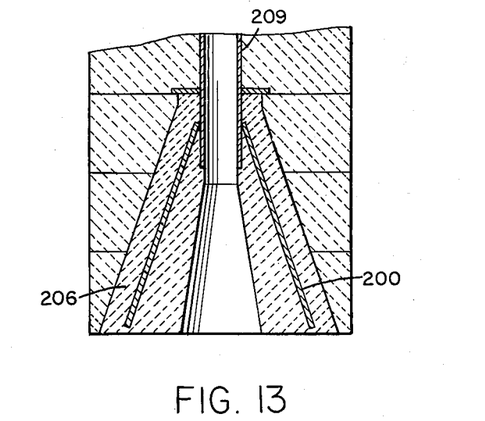

Fig. 13 is a variation of Fig. 12. A steel skirt 200 is welded on a surface of the bottom end of the injection tube 209, and extends to about four inches from the floor of the forehearth. The skirt 200 is surrounded by the plastic refractory material 206 extending to at least three (3) inches from the floor. The primary purpose of skirt 200 is to prevent any loss of gas pressure through the side wall of the injection tube and to insure the maintenance of adequate gas pressure at the exit end of the injection tube, where it discharges gas and carbide into the fresh incoming metal. The skirt 200 may be made of steel or any other reinforcing material which prevents leakage of gas. It has been found in actual operations that, if the injection tube is not gas-tight, clogging will occur. A gas-tight assembly permits uninterrupted and proper feeding of carbide.

Figure 14:
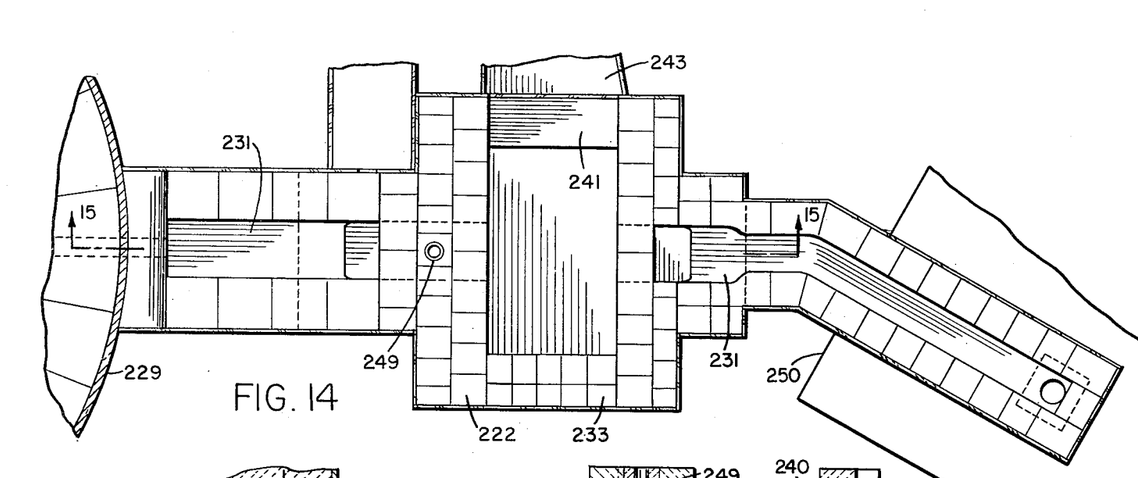
Fig. 14 is a plan view illustrating a continuous operation involving the use of a cupola and a holding vessel where the desulphurization of the molten metal is effected.
Figure 15:
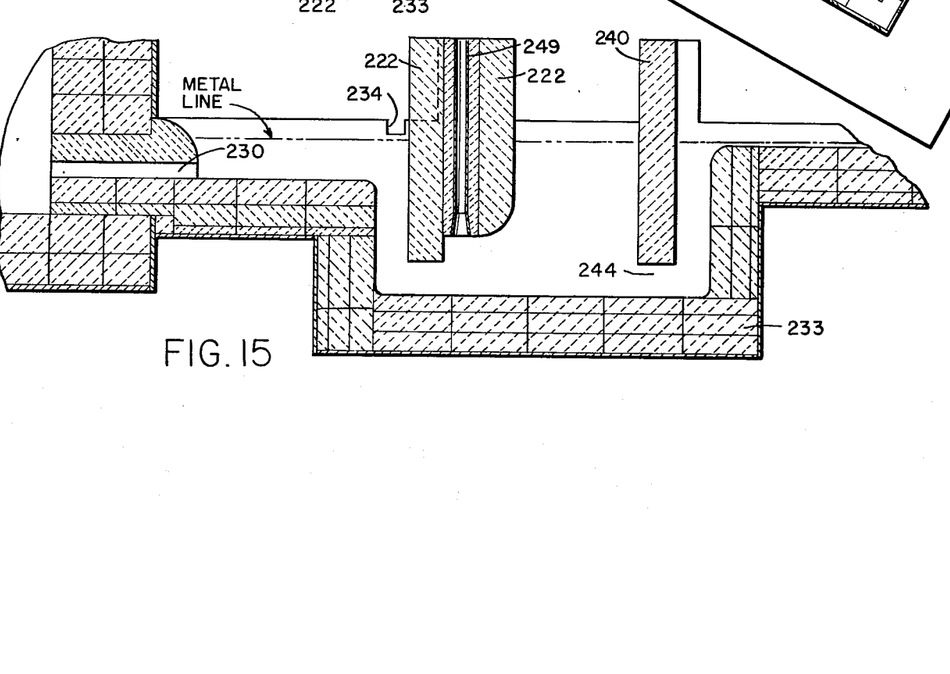
Fig. 15 is a section on the line 15—15 of Fig. 14.

While a specific embodiment of the invention has been detailed and described in connection with a conventional cupola and forehearth vessel, equally good results may be obtained when the metal is treated in other holding vessels. Referring to Figs. 14 and 15, the invention may be applied to the continuous treatment of molten ferrous metal from a cupola 229 which is adapted to deliver the metal continuously at a predetermined rate through a tap hole 230 provided for that purpose. A holding vessel 233 may be established nearer to the cupola than the conventional forehearth vessel, by widening and deepening a section of the runner or launder 231 used for conveying molten metal away from the cupola 229. An injection pipe assembly of the general type previously described and illustrated in Figs. 3 to 13 may then be built into the launder 231 at the inlet end of holding vessel 233. The assembly comprises an injection pipe 249 covered by refractory material 222; and it may be built to serve also as a baffle for diverting the cupola slag through notch 234, just above the surface of the molten metal. A conventional baffle or dam 240 may also be inserted into the vessel 233 near the outlet end thereof to separate the dross or slag formed by the carbide treatment from the treated metal which passes into the outlet end of launder 231 and thence into a suitable container 250. Calcium carbide is thus introduced into the incoming hot metal stream flowing under the injection pipe 249, which stream is relatively fast-flowing and has a higher temperature and a higher sulphur content than the body of metal in the vessel 233. The carbide reacts with the sulphur in the hot metal stream to form reaction products which together with the unreacted calcium carbide separate from the treated molten metal and rise continuously to the surface of the metal contained in the enlarged portion of the launder between the baffle-injection assembly and the dam 240. The dry slag or dross thus accumulating on the surface of the relatively quiescent body of molten metal between the baffle 222 and the dam 240 is then removed through gate 241 and into chute 243. The treated molten metal is withdrawn from the body of metal in vessel 233 through an opening 244 at the bottom of dam 240 where the metal is substantially free of any of the products of reaction and unreacted calcium carbide.

In all modifications of the apparatus as shown in Figs. 3 to 15, the plastic refractory may be mixed with quartz or refractory glass fibers prior to hardening, so that the finished tube comprises fiber reinforced refractory plastic.

To treat molten metal continuously as shown in Fig. 3 or 15, the rate of carbide flow into the molten metal is preselected in terms of the total weight of carbide to be injected per ton of metal (which is normally calculated in terms of the pounds of sulphur to be removed per ton of metal, and which may be within the range of from 1.5 to 150 lbs. of carbide per ton of metal). For example, if the molten metal is flowing at the rate of ten tons per hour, carbide flow selected may be at some rate within the range of from 0.25 lb. per minute to 25 lbs. per minute. The gas flow is then adjusted to provide the minimum rate of gas flow necessary to carry such amount of carbide into the molten metal. In a typical operation, the rate of carbide injection is set at 1.3 lbs. per minute for a ten (10) ton per hour flow of molten metal, and the gas flow rate is maintained between 60 and 100 cubic feet per hour, with a standard steel pipe of approximately one inch internal diameter The nitrogen gas pressure at the discharge end of the pipe 49 will vary with the head of metal; for example, it might be at about 6 p. s. i. for about a 24" head of metal. The rate of carbide injected per minute through a single injection pipe should not exceed about 25 lbs. of carbide injected per minute, nor should it be less than about one-fourth (¼) lb. per minute. If more carbide flow is required per minute to adequately treat the metal, two or more injection pipes should be used.

For optimum results with apparatus disclosed in Figs. 3 to 15, I have found that the calcium carbide particles should be finer than 6 mesh (.1310 in. openings) and preferably less than 10 mesh (.065 in. openings) with at least 50% of the total carbide finer than 48 mesh (.0116 in. openings).

With a construction as shown in Figs. 3 to 15, the life of the injection assembly is greatly increased, even under the adverse temperature conditions of a molten metal bath. With conventional injection pipes, the temperature gradient between the inner and outer surfaces thereof is extremely steep. The relatively cold gas and solid particles flowing through the pipe keep the inner surface cool; while the outer surface assumes the temperature of the molten metal, or the temperature of any material surrounding it. A relatively thick refractory cover, as illustrated in the drawings, decreases the temperature gradient and therefore decreases thermal shock. Further, pipe assembly is stationary or fixed in all embodiments of the apparatus, and in some embodiments it is exposed to the hot metal on only two opposite sides, the other two sides being completely protected. Extending the useful life of the injection pipe assembly in this manner permits an uninterrupted desulphurizing treatment in the previously described continuous forehearth operation, so that the resulting product has a uniform and predetermined sulphur content.

It will be seen that with an apparatus as illustrated in Figs. 3 to 15, the fresh incoming metal from the cupola 129 descends into the forehearth 133 through a vertical passage, directly in back of the carbide injection tube. This fresh, relatively fast-flowing stream of metal has a higher sulphur content (or higher concentration of sulphur) than the relatively slow moving treated metal in the forehearth itself. The finely divided particles of carbide supplied through the tube thus are injected directly into, and come into intimate contact with, the fresh metal flowing from the cupola bottom which contains a relatively high percentage of sulphur; and it has been found that desulphurization can thereby (probably as a result of the Law of Mass Action) be effected more rapidly and more efficiently and more completely than is possible in the conventional methods. Further, the incoming metal is at a somewhat higher temperature when it enters the forehearth than at any other time, which feature also promotes more efficient desulphurization.

The freshly incoming, relatively turbulent metal stream sweeps transversely across and under the stream of incoming carbide near the bottom of the container, and the resulting turbulent action aids in entraining and disseminating the finely divided carbide particles throughout the mass of metal in the container. The carbide particles thus have a greater opportunity to react with and remove the sulphur from the metal, after which the resulting dross separates from the relatively quiescent molten metal in the forehearth.

Figure 16:
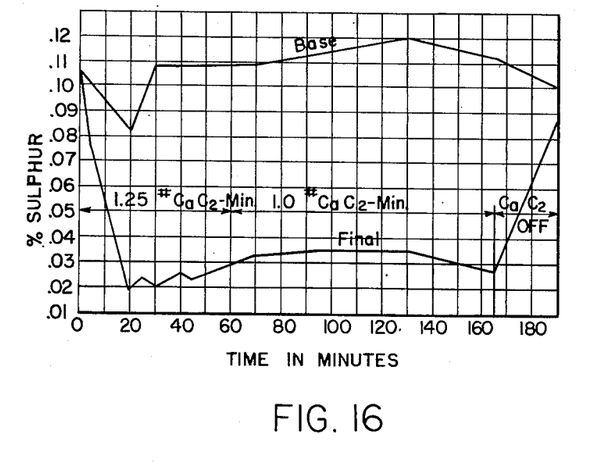
Fig. 16 is a graph showing the results that may be accomplished with the apparatus illustrated in Figs. 3–15.

With apparatus illustrated in Figs. 3–15, the results indicated in Fig. 16 may be obtained. In the continuous operation illustrated in Fig. 16, the rate of flow of the molten metal is 8.1 tons per hour; and the regulated nitrogen flow rate is approximately 100 cubic feet per hour. The regulated flow of calcium carbide is 1.25 pounds per minute during the first sixty (60) minutes, 1.0 pound of calcium carbide per minute in the next one hundred and five (105) minutes, and no flow of carbide in the next twenty-five (25) minutes. As indicated, when the carbide is injected into the molten metal, the sulphur content of the metal is reduced from a range of .08 to .12 per cent sulphur to a range of .02 to .035 per cent sulphur. An average of 3.8 lbs. of carbide is used to remove one pound of sulphur from the metal, or 0.79 lb. per ton per 0.010 per cent sulphur removed. When calcium carbide is first injected into the molten metal, a short interval of time is required to lower the sulphur content down to a predetermined amount, since the original metal bath has had no desulphurizing treatment. This fact explains the apparent discrepancy in the graph with regard to the sulphur content of the metal during the first twenty minutes.

An important advantage of the invention is that there is no reversal of the reaction of the sulphur with the carbide. Once the sulphur has combined with the carbide, it is carried from the metal and the sulphur does not return to the metal as in the case of other reagents. The cupola slag or any other acid slag that may normally be present is removed (as shown at 134 in Figs. 3 and 7 and at 234 in Fig. 15) prior to the injection of carbide. Thus the products of the carbide reaction float out as a dross or dry slag, free of any substantial amounts of cupola slag or other substances which might cause reversion of the carbide reaction. However, basic slags are ordinarily not harmful and may sometimes be permitted to contact the carbide slag without causing reversion of the sulphur removed from the molten metal. While the inner lining of the forehearth 133, or other holding or treating vessel, may comprise either an acid or basic material as described hereinbefore, it has been found experimentally that best results are obtained when the holding vessel is basic lined, particularly for the production of treated irons at very low sulphur levels.

The present invention applies to all ferrous metals containing detrimental or undesirable amounts of sulphur and/or like impurities which can be removed by carbide treatment. These include acid or basic cupola or electric furnace iron; acid or basic electric furnace steel; acid or basic open hearth furnace steel; acid or basic Bessemer converter and reverberatory furnace steel; acid or basic reverberatory or air furnace iron; and blast furnace iron. It can be used in conjunction with the invention disclosed in the Crockett and Hulme application Ser. No. 246,314, filed September 12, 1951, for making upgraded cast iron and for making nodular cast iron.

The specific method and apparatus described above are primarily applicable to the treatment of molten ferrous metal with calcium carbide, but it will be apparent to those skilled in the art that

I claim:

1. In an apparatus for treating molten ferrous metal containing sulphur with calcium carbide, the combination of a melting furnace adapted to supply a continuous stream of molten metal, a slag skimmer, a forehearth to receive the molten metal, a metal inlet duct extending from said skimmer to the floor of the forehearth, a metal-receiving passage recessed into the side wall of said forehearth and extending to said duct, a conduit extending through the side wall of said forehearth with its bottom open end terminating in said receiving passage, a frame mounted above the forehearth, a mechanically driven screw feeding means supported on said frame for delivering finely divided calcium carbide to the upper end of the conduit, and means for supplying a gaseous medium through the conduit and for maintaining the gaseous medium at a pressure sufficient to prevent the molten metal from rising in the conduit.

2. In a method for refining cupola iron, the steps comprising, removing the cupola slag from a flowing stream of molten cupola iron, injecting finely divided calcium carbide and a gas into said flowing molten stream subsequent to the removal of the cupola slag therefrom, said carbide being injected at a substantially uniform rate in the range of from one-fourth (¼) pound of carbide per minute to 25 pounds of carbide per minute and said gas being injected at a rate of flow in cubic feet per minute sufficient to carry the carbide particles into the flowing molten stream but not exceeding about two (2) cubic feet of gas per pound of carbide injected, reducing the velocity of the flowing molten stream subsequent to the injection of carbide therein to provide a substantially quiescent body of molten iron wherein the products of the reaction of the carbide with impurities in the iron float out to the upper surface of the molten iron as a dry basic slag or dross, and removing treated iron from said quiescent body at a lower portion thereof from which the products of the carbide-impurity reaction and any unreacted carbide have substantially completely separated.

3. In a method of refining cupola iron, the steps comprising, removing cupola slag from a flowing stream of molten cupola iron, injecting the particles of a finely divided treating agent consisting essentially of calcium carbide and a gas into said flowing molten stream subsequent to the removal of the cupola slag therefrom, said particles being injected at a substantially uniform rate in the range of from one-fourth pound of particles per minute to twenty-five pounds of particles per minute and said gas being injected at a rate of flow in cubic feet per minute sufficient to maintain the flow of gas relative to the flow of particles within the range of from about one-fourth to about two cubic feet of gas per pound of particles injected, and separating from the treated metal the products of the reaction of said particles with impurities in the iron as a dry basic slag, to provide a refined molten ferrous metal from which the products of the carbide-impurity reaction and any unreacted carbide have been substantially completely removed.

4. In a method of refining cupola iron, the steps comprising, removing cupola slag from a stream of molten cupola iron flowing in a basic lined receptacle, injecting particles of a treating agent consisting essentially of finely divided calcium carbide having a particle size finer than 10 mesh and a gas into said flowing molten stream subsequent to the removal of the cupola slag therefrom, said particles being injected at a substantially uniform rate in the range of from one-fourth pound of particles per minute to twenty-five pounds of particles per minute and said gas being injected at a rate of flow in cubic feet per minute sufficient to maintain the flow of gas relative to the flow of particles within the range of from about one-fourth to about two cubic feet of gas per pound of particles injected, and separating from the treated metal the products of the reaction of said particles with impurities in the iron as a dry basic slag, to provide a refined molten ferrous metal from which the products of the carbide-impurity reaction and any unreacted carbide have been substantially completely removed.

References Cited in the file of this patent

UNITED STATES PATENTS

| Number | Name | Date |
|---|---|---|
| 714,450 | Carson | Nov. 25, 1902 |
| 905,948 | Stromborg | Dec. 8, 1908 |
| 1,151,332 | Baggaley | Aug. 24, 1915 |
| 1,541,778 | Agricola | June 16, 1925 |
| 2,525,973 | Sundstrom et al. | Oct. 17, 1950 |
| 2,577,764 | Hulme | Dec. 11, 1951 |

OTHER REFERENCES

Blast Furnace Practice, pages 38 and 39. Edited by Sweetser. Published in 1938 by the McGraw-Hill Book Co.